United States Patent
Shim

(10) Patent No.: US 6,483,262 B2
(45) Date of Patent: Nov. 19, 2002

(54) APPARATUS AND METHOD FOR RING SPLINE CONVERGENCE CORRECTION

(75) Inventor: Jae-seung Shim, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/765,350

(22) Filed: Jan. 22, 2001

(65) Prior Publication Data

US 2001/0021007 A1 Sep. 13, 2001

(30) Foreign Application Priority Data

Jan. 21, 2000 (KR) .......................................... 2000-2959

(51) Int. Cl.[7] ................................................ G09G 1/28
(52) U.S. Cl. ............................. 315/368.13; 315/368.11; 313/412; 348/806
(58) Field of Search ...................... 315/368.13, 368.11, 315/368.12, 308; 313/412, 415, 428; 348/466, 806, 807, 811

(56) References Cited

U.S. PATENT DOCUMENTS

| | | | | |
|---|---|---|---|---|
| 4,871,948 A | * | 10/1989 | Nelson | 315/368.13 |
| 4,980,614 A | * | 12/1990 | Yamada et al. | 315/367 |
| 5,345,280 A | * | 9/1994 | Kimura et al. | 315/368.12 |
| 5,506,481 A | * | 4/1996 | Wada et al. | 315/368.12 |

* cited by examiner

Primary Examiner—Don Wong
Assistant Examiner—Thuy Vinh Tran
(74) Attorney, Agent, or Firm—Sughrue Mion, PLLC

(57) ABSTRACT

An apparatus and method for ring spline convergence correction for accurately affecting convergence at the outermost portion of a screen using ring spline interpolation are provided. Convergence correction data between seed data is output through an operation using a spline interpolation polynomial in the form of a ring which is continuous with an adjacent line, thereby accurately calculating convergence correction data at the outermost point of a screen to minimize the error in convergence.

15 Claims, 3 Drawing Sheets

○ : CONTROL POINT
△ : VIRTUAL POINT

APPARATUS AND METHOD FOR RING SPLINE CONVERGENCE CORRECTION

BACKGROUND OF THE INVENTION

1. Field of the Invention

The present invention relates to an apparatus and method for correcting convergence in a television, and more particularly, to an apparatus and method for ring spline correction, which is capable of accurately effecting the convergence at the outermost portion of a screen. The present application is based on Korean Patent Application No. 2000-2959 filed on Jan. 21, 2000, which is incorporated herein by reference.

2. Description of the Related Art

A projection television includes red (R), green (G), and blue (B) cathode-ray tubes (CRTs) for displaying R, G, and B color images to project the displayed images onto a screen. As shown in FIG. 1, the distance and angle between each of R, G, and B CRTs and the screen is different, and thus convergence needs to be controlled so that the R, G, and B color signals may focus on one point.

A typical convergence control is performed in such a way that the R and B color images converge around the G color image. Specifically, a cross hatch pattern generated by a pattern generator is applied to the R, G, and B CRTs to obtain images projected onto the screen. Then, the degree to which R, G, and B images projected onto the screen are misconverged is detected through a charge coupled device (CCD), and then convergence correction values for correcting drive voltages applied to a convergence yoke of the R, G, and B CRTs according to the detected degree of misconvergence is calculated. The calculated convergence correction values are then stored in a memory and convergence is controlled by the stored convergence correction values.

An example of convergence correction algorithms is a spline operation algorithm. To perform an operation according to a spline operation algorithm, three point values and a slope between two end points are needed. As shown in FIG. 2, to obtain convergence correction values at an interval A with a point ① corresponding to the outermost portion of a screen, information on a slope is not available. To solve this problem, virtual points x and y are set so that the x and y point values are equal to ① and ⑤ point values, respectively, and the values of both intervals E and F are set to be equal. Thus, this allows for the operation of a slope between points ① and ⑤, and further a spline operation for calculating the convergence correction values.

However, in the case of using the conventional spline operation algorithm, the operation at both the outermost intervals of the screen results in an error between slopes obtained from virtual point values and real values to thereby degrade accuracy for the spline operation result. Furthermore, this causes misconvergence at the outermost portion of the screen, which lowers image quality.

SUMMARY OF THE INVENTION

To solve the above problems, it is an objective of the present invention to provide an apparatus and method for ring spline convergence that reduces errors of convergence correction values at the outermost points of a screen.

Accordingly, to achieve the above objectives, the present invention provides a ring spline convergence correction apparatus in a television including a microprocessor for performing an operation to output unknown coefficients of a convergence interpolation polynomial in each interval between two points having adjacent coordinates, assuming that coordinate values at control points of adjacent lines are continuous, a memory for temporarily storing the unknown coefficients output by the microprocessor, a position coordinate generator for performing a predetermined operation to output coordinate values of a predetermined function at the control point, and an operator for outputting convergence correction values interpolated by applying the coordinate values of the predetermined function output from the position coordinate generator and the unknown coefficients read from the memory to the convergence interpolation polynomial.

The present invention also provides a ring spline convergence correction method for use in a television, which includes the steps of: (a) performing a predetermined operation to output unknown coefficients of a convergence interpolation polynomial in each interval between two points having adjacent coordinates, assuming that the coordinate values of control points on adjacent lines are continuous; (b) performing a predetermined operation to output the coordinate values of the convergence control point; and (c) performing a ring spline operation to output an interpolated convergence correction value by applying the unknown coefficients output in the step (a) and the coordinate values output in the step (b) to the convergence interpolation polynomial.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
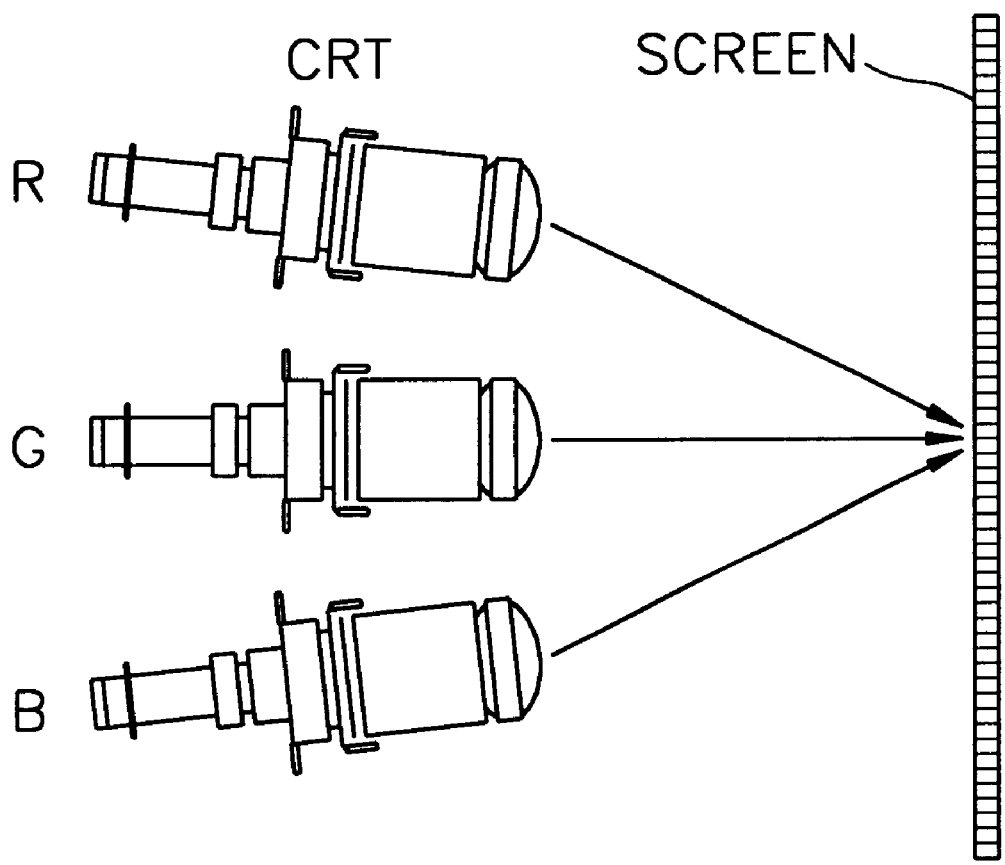
FIG. 1 shows the structure of a cathode-ray tube (CRT) and a screen in a typical projection television.
Figure 2:
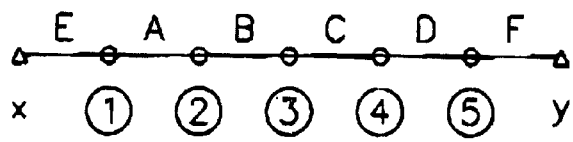
FIG. 2 shows a state in which convergence control points are connected for explaining a conventional spline interpolation method.

To aid the understanding of the present invention, initially a spline interpolation method will now be described briefly. Many points constructing the screen may be points on a single curve. In this case, if Larange interpolation or a Newton interpolation is used, as the order of an interpolation polynomial increases, an error becomes larger. To overcome this drawback, the known three-dimensional spline interpolation is used.

In the three-dimensional spline interpolation, $a \leq x \leq b$ is divided into $a = x_0 < x_1 < \ldots < x_n = b$, and a third order polynomial function with four unknown coefficients $a_i$, $b_i$, $c_i$, and $d_i$ is used between two points $(x_i, y_i)$ and $(x_{i+1}, y_{i+1})$ of adjacent coordinates in each interval. Two of the four unknown coefficients in the third order polynomial function can be obtained from a condition that the third order polynomial function must pass through the two points $(x_i, y_i)$ and $(x_{i+1}, y_{i+1})$, and the remaining two unknown coefficients can be obtained from the fact that primary and secondary differential values must be continuous at the given two points $(x_i, y_i)$ and $(x_{i+1}, y_{i+1})$.

$$y = a_i(x-x_i)^3 + b_i(x-x_i)^2 + c_i(x-x_i) = d_i \qquad (1)$$

Since Equation (1) passes through the above two points, it is expressed by Equation (2). In this case $h_i = x_{i+1} - x_i$.

$$y_i = a_i(x_i-x_i)^3 + b_i(x_i-x_i)^2 + c_i(x_i-x_i) + d_i = d_i \qquad (2)$$

$$y_{i+1} = a_i(x_{i+1}-x_i)^3 + b_i(x_{i+1}-x_i)^2 + c_i(x_{i+1}-x_i) + d_i \qquad (3)$$

$$= a_i h_i^3 + b_i h_i^2 + c_i h_i + d_i$$

Then, primary and secondary differentiations of y with respect to x are obtained by:

$$y' = 3a_i(x-x_i)^2 + 2b_i(x-x_i) + c_i \qquad (4)$$

$$y'' = 6a_i(x-x_i) + 2b_i \qquad (5)$$

Assuming secondary differential values at the two points $(x_i, y_i)$ and $(x_{i+1}, y_{i+1})$ are $S_i$ and $S_{i+1}$, respectively, $S_i$ and $S_{i+1}$, are obtained by:

$$S_i = 6a_i(x_i-x_i) + 2b_i = 2b_i \qquad (6)$$

$$S_{i+1} = 6a_i(x_{i+1}-x_i) + 2b_i = 6a_i h_i + 2b_i \qquad (7)$$

Then, the unknown coefficients $a_i$, $b_i$, $c_i$, and $d_i$ are obtained by the following equations:

$$b_i = \frac{S_i}{2} \qquad (8)$$

$$a_i = \frac{S_{i+1} - S_i}{6h_i}$$

$$d_i = y_i$$

$$c_i = \frac{y_{i+1} - y_i}{h_i} - \frac{2h_i S_i + h_i S_{i+1}}{6}$$

If $(x_i, y_i)$ is substituted into Equation (4) using a condition that a differential value in a common point $(x_i, y_i)$ in the relations of $(x_{i-1}, y_{i-1})$ and $(x_i, y_i)$, and points $(x_i, y_i)$ and $(x_{i+1}, y_{i+1})$ is equal, it is given by Equation (9):

$$y' = 3a_i(x_i-x_i)^2 + 2b_i(x_i-x_i) + c_i = c_i \qquad (9)$$

If the point $(x_{i-1}, y_{i-1})$ is substituted into the given primary differential equation in the relation of points $(x_{i-1}, y_{i-1})$ and $(x_i, y_i)$, it is expressed by Equation (10). In this case, $h_{i-1} = x_{i-1} - x_i$:

$$y' = 3a_{i-1}(x_{i-1} - x_i)^2 + 2b_i(x_{i-1} - x_i) + c_i \qquad (10)$$

$$= 3a_{i-1}h_{i-1}^2 + 2b_{i-1}h_{i-1} + c_{i-1}$$

In this case, since Equations (9) and (10) have the same value, if the values ai, bi, ci, and di in Equation (8) are substituted into Equations (9) and (10), respectively, it is finally expressed by Equation (11):

$$h_{i-1}S_{i-1} + (2h_{i-1} + 2h_i)S_i + h_i S_{i+1} = 6\left(\frac{y_{i+1} - y_i}{h_i} - \frac{y_i - y_{i-1}}{h_{i-1}}\right) \qquad (11)$$

Equation (11) can be applied up to points where i equals n−1. In this case, the problem is that the four unknown coefficients $a_i$, $b_i$, $c_i$, and $d_i$ can be obtained only when the values from $S_2$ to $S_{n-1}$ are known. However, since the values of $S_1$ and $S_n$ are unknown, the values of $S_2$ and $S_{n-1}$ cannot be known, either. Thus, after setting the values of $S_1$ and $S_n$, the values from $S_2$ to $S_{n-1}$ are obtained to determine the four coefficients $a_i$, $b_i$, $c_i$, and $d_i$. According to a conventional art, it is determined that $S_1 = S_n = 0$ or $S_1 = S_2$ and $S_n = S_{n-1}$.

Then, to implement the spline interpolation algorithm in hardware, the third order spline polynomial function is simplified as follows. Initially, if Function f(x) is defined in intervals $a \leq x_0 \leq b$ and g(x) and the Function f(x) approaches g(x), and $<x_1< \ldots <x_n = b$, a third order function $p_j(X)$ that satisfies the following conditions can be obtained.

(Condition 1)

$$g(x_0) = f(x_0) = f_0, g(x_1) = f(x_1) = f_1, \ldots, g(x_n) = f(x_n) = f_n \qquad (12)$$

(Condition 2)

$$g'(x_0) = k_0, g'(x_0) = k_n \qquad (13)$$

where $k_0$ and $k_n$ are values to be later calculated.

Thus, the only third order polynomial function that satisfies Equations (12) and (13) is expressed by Equation (14), and coefficients in Equation (14) can be obtained through Equations (15) and (16):

$$p_j(x) = a_{j0} + a_{j1}(x-x_j) + a_{j2}(x-x_j)^2 + a_{j3}(x-x_j)^3 \qquad (14)$$

$$k(j-1) + 4kj + k(j+1) = (3/h)\{f(j+1) - f(j-1)\} \qquad (15)$$

where j equals one to n-1, and n equals the number of intervals.

$$a_{j0} = p(x_j) = f_j \qquad (16)$$

$$a_{j1} = p'(x_j) = k_j$$

$$a_{j2} = (1/2)p''j(x_j) = (3/h^2)(f_{j+1} - f_j) - (1/h)(k_{j+1} + 2k_j),$$

$$a_{j3} = (1/6)p'''j(x_j) = (2/h^3)(f_j - f_{j+1}) - (1/h^2)(k_{j+1} + 2k_j)$$

Hereinafter, $a_{j0}$ in Equation (16) is denoted by $Y_0$ as a function at the points where convergence will be controlled, and $a_{j1}$ is a slope at the corresponding point, which can be obtained through Equation (15) and hereinafter denoted by $K_1$. The remaining unknown coefficients $a_{j2}$ and $a_{j3}$, which are hereinafter denoted by $A_{12}$ and $A_{13}$, respectively, also can be obtained if one knows the function and the slope at the point where convergence will be controlled. The value h in Equation (16) denotes an interval between adjacent points which are assumed to be evenly spaced. Furthermore, if Equations (15) and (16) are simplified, the third order spline interpolation polynomial function is simplified as left and right functions as shown in Equations (17) and (18):

$$f(L) = Y_0 + K_0 X_1 + A_{02} X_1^2 + A_{03} X_1^3 \qquad (17)$$

$$f(R) = Y_1 + K_0(M-X_1) + A_{12}(M-X_1)^2 + A_{13}(M-X_1)^3 \qquad (18)$$

where M denotes an boundary reference value on an x-axis. $X_1$ denotes a changing coordinate on a horizontal line. The difference between the boundary reference value M and the changing coordinate $X_1$ is expressed as the value X. Furthermore, a continuous third order spline interpolation polynomial at a continuous point does not need two functions with respect to one reference point if a coefficient is obtained only in one way, and only one unidirectional function can be a wholly continuous function. In this sense, the third order spline interpolation polynomial function is expressed by Equation (19):

$$f(X) = Y_0 + K_1 X + A_{12} X^2 + A_{13} X^3 \quad (19)$$

Figure 3:
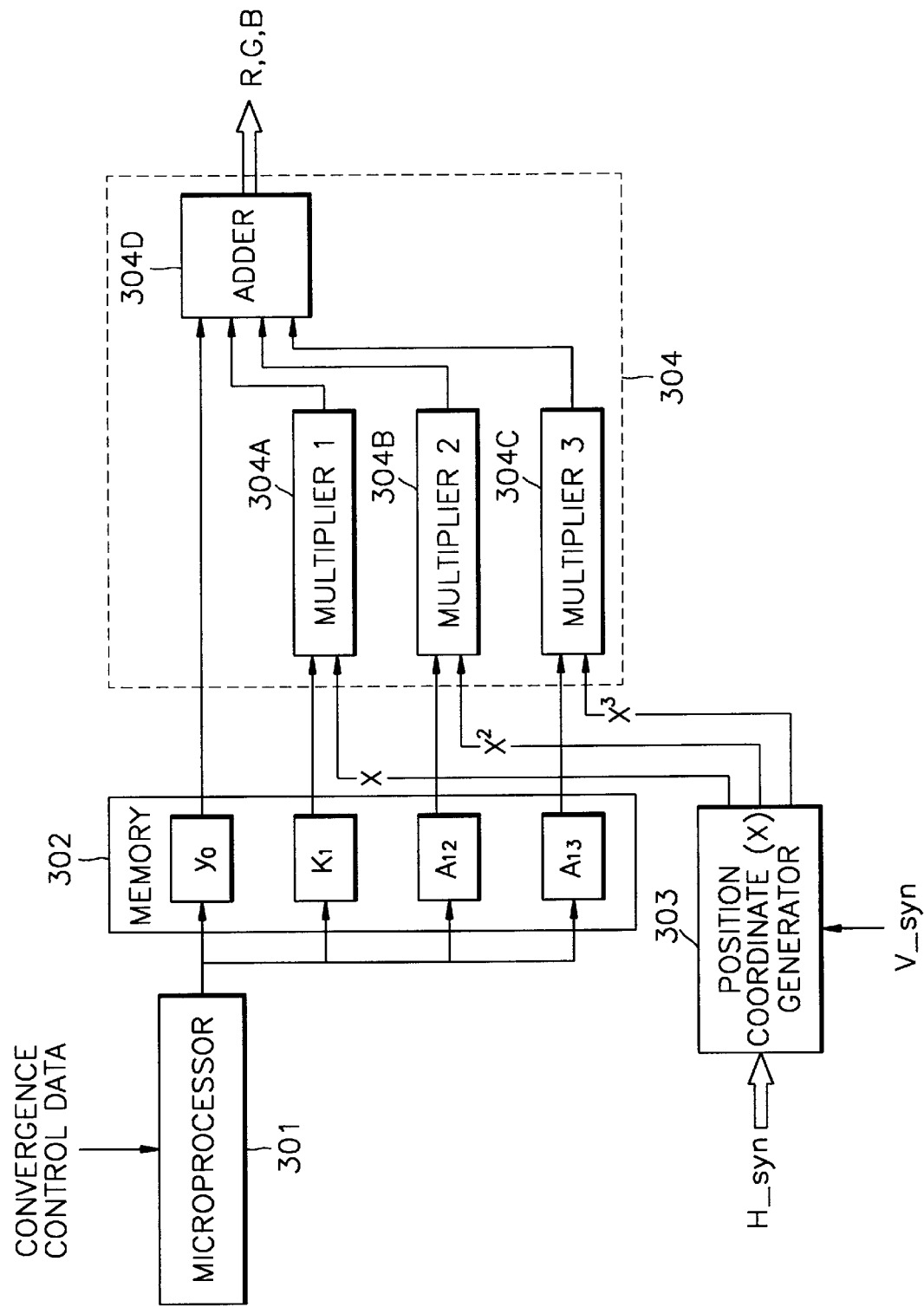
FIG. 3 is a block diagram showing the construction of a ring spline convergence correction apparatus according to the present invention.

That is, if the third order spline interpolation polynomial function is simplified as shown in Equation (19), it can be constructed as hardware as shown in FIG. 3, and a microprocessor 301 therein performs an operation to output unknown coefficients $Y_0$, $K_1$, $A_{12}$, and $A_{13}$ which in turn are used in controlling convergence.

Then, an apparatus and method for ring spline convergence correction for improving a convergence operation in both end intervals of seed data by spline interpolation will now be described. As shown in FIG. 3, an apparatus for ring spline convergence correction according to the present invention includes a microprocessor 301, a memory 302, a position coordinate generator 303, and an operator 304. The operator 304 includes multipliers 304A, 304B, and 304C, and an adder 304D. In order to interpolate the values between convergence control points forming a plurality of horizontal lines and a plurality of vertical lines, the microprocessor 301 calculates the unknown coefficients $Y_0$, $K_1$, $A_{12}$, and $A_{13}$ of the third order spline interpolation polynomial in each interval divided by the control points to store them in the memory 302. When performing a predetermined operation to output the unknown coefficients $Y_0$, $K_1$, $A_{12}$, and $A_{13}$, secondary differential values $S_1$ and $S_n$ of Equation (19) at the outermost point of a horizontal line are not set to a specific value "0" as in a conventional art but operated as follows.

Figure 4:
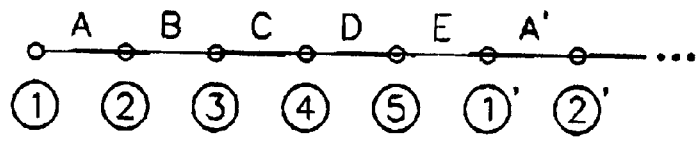
FIG. 4 shows a state in which convergence control points are connected for explaining a ring spline convergence correction method according to the present invention.

That is, as shown in FIG. 4, when calculating a differential value at a point ⑤ corresponding to the outermost point of a horizontal synchronization signal line, the microprocessor 301 substitutes a point ①' value corresponding the first point value on the immediately next horizontal synchronization line as an adjacent point value to calculate the secondary differential value Sn at the outermost point. Thus, an interval A' is continuously connected as the same interval one horizontal line below an interval A. In other words, the points ①' and ②' are one horizontal line below points ① and ②.

In this case, when compared with points one horizontal line below, the difference in convergence correction amount is too small to distinguish an error. Furthermore, since convergence correction values at the interval A are almost the same as convergence correction values at the interval A' next to an interval E, the point ①' is regarded as the point ① to perform an operation. In this case, control points are connected in the form of A-B-C-D-E-A'. That is, since a slope can be calculated over all intervals, an operation value for the interval E can be readily obtained.

A spline interpolation operation at the first point on the first horizontal synchronization line is performed, assuming that the first point value on the second horizontal synchronization line is an adjacent point value. Similarly, a spline interpolation operation at the last point on the last horizontal synchronization line is performed assuming that the last point value on the preceding horizontal synchronization line is an adjacent point value.

The position coordinates of a vertical axis direction are output by the position coordinate generator 303 by performing an operation in the following manner. The position coordinate generator 303 counts the number of horizontal synchronization signals H_sync and performs an operation to output X, X-squared ($X^2$), and X-cubed ($X^3$) as the position coordinate values of the vertical axis direction, where X is the difference between the boundary reference value M and the number $X_1$ of changing horizontal synchronization lines. Then, a counter for counting the number of horizontal synchronization signals is reset by a vertical synchronization signal V_sync. The boundary reference value M corresponds to values 64, 128, 192, and 256 of horizontal synchronization lines that divide the screen by seed data.

If the built-in counter is designed to count all the horizontal synchronization signals H_sync during one field or frame, the counted value of the horizontal synchronization signals H_sync may be set as the value X.

Next, the position coordinate generator 303 outputs the position coordinates of a horizontal axis direction by performing an operation in the following manner. The position coordinate generator 303 is reset by a horizontal synchronization signal H_sync, and determines a value, which is obtained as a result of counting the number of pulses obtained by dividing the frequency of a system clock signal, as the value X. Then, the position coordinate generator 303 outputs the values X, $X^2$ and $X^3$ as the position coordinate values of the horizontal axis direction.

The multipliers 304A, 304B and 304C perform a multiplication operation using X, $X^2$ and $X^3$ output from the position coordinate generator 303 and the unknown coefficients $K_1$, $A_{12}$, and $A_{13}$ read from the memory 302, respectively, in order to calculate each term of the convergence interpolation polynomial, and the multipliers output results to the adder 304D. Then, the adder 304D adds the unknown coefficient $Y_0$ read from the memory 302, and the values input from the multipliers 304A, 304B, and 304C, thereby outputting interpolation data for values between control points in the third order spline interpolation polynomial function f(x). Accordingly, current applied to convergence deflection coils of the R, G, and B CRTs is regulated to effect the control of convergence for R. G, and B colors, referring to the interpolation data.

Figure 5:
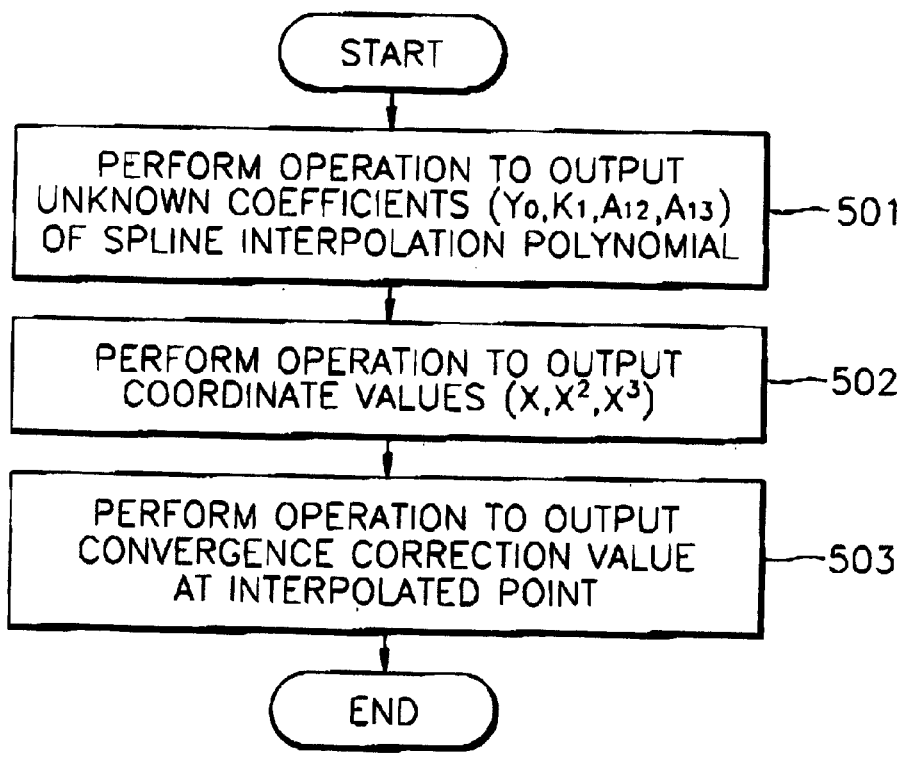
FIG. 5 is a flowchart showing the ring spline convergence correction method according to the present invention.

Next, a method for ring spline convergence correction will now be described with reference to a flowchart of FIG. 5. In step 501, the microprocessor 301 performs an operation to obtain the unknown coefficients $Y_0$, $K_1$, $A_{12}$, and $A_{13}$ of the third order spline interpolation polynomial in each interval divided by control points so as to interpolate the values between convergence control points forming a plurality of horizontal synchronization lines and a plurality of vertical lines. As shown in FIG. 4, when calculating a differential value at a point ⑤ corresponding to the outermost point of a horizontal synchronization signal line, the microprocessor 301 substitutes a point ①' corresponding to the first point on the immediately next horizontal synchronization line as an adjacent point value to calculate the secondary differential value $S_n$ at the outermost point. Thus, the interval A' is continuously connected as the same interval one horizontal synchronization line below the interval A. In other words, the points ①' and ②' are one horizontal synchronization line below points ① and ②. As a result, control points are connected in the form of A-B-C-D-E-A', and thus there is no end of each interval. Thus. this allows the unknown coefficients of the spline polynomial to be continuously calculated over all intervals constituting one screen.

In step 502, an operation is performed to obtain the coordinate values X, $X^2$ and $X^3$ of the convergence control point. That is, in correcting a convergence of the vertical axis direction, the values X, $X^2$ and $X^3$ are output as the coordinate values, where X is obtained as a result of counting the number of the horizontal synchronization signals H_sync, and a counter for counting the number of horizontal synchronization signals is reset by the vertical synchronization signal V_sync. In correcting a convergence of the horizontal axis direction, the position coordinate generator 303 performs an operation to output the values X, $X^2$ and $X^3$ as the coordinate values, where X is obtained as a result of counting the number of pulses obtained by dividing the frequency of a system clock signal, and counting is reset by the horizontal synchronization signal H_sync.

In step 503, a predetermined operation is performed to output a convergence correction value at an interpolated point by applying the unknown coefficients of the spline interpolation polynomial operated in the step 501 and the coordinate values operated in the step 502 to the spline interpolation polynomial.

When performing a predetermined operation in this way to output convergence interpolation data of a horizontal or vertical synchronization line, convergence correction data is calculated by a spline interpolation polynomial in the form of a ring which is continuous with the next line.

As described above, according to the present invention, convergence correction data between seed data are output by a spline interpolation polynomial in the form of a ring which is continuous with the next line, thereby accurately calculating convergence interpolation data at the outermost point of a screen to minimize the error in convergence.

What is claimed is:

1. An apparatus for ring spline convergence correction in a television, the apparatus comprising:
    a microprocessor for performing an operation to output unknown coefficients of a convergence interpolation polynomial in each interval between two points having adjacent coordinates, assuming that coordinate values at control points of adjacent lines are continuous;
    a memory for storing the unknown coefficients output by the microprocessor;
    a position coordinate generator for performing a predetermined operation to output the coordinate values of a predetermined function at the control points; and
    an operator for outputting convergence correction values interpolated by applying the coordinate values of the predetermined function output from the position coordinate generator and the unknown coefficients read from the memory to the convergence interpolation polynomial.

2. The apparatus of claim 1, wherein the unknown coefficients output by the microprocessor are temporarily stored in the memory.

3. The apparatus of claim 1, wherein the convergence interpolation polynomial is a third order spline interpolation polynomial, and the third order spline interpolation polynomial is expressed by the function $f(X)=Y_0+K_1X+A_{12}X^2+A_{13}X^3$, where $Y_0$, $K_1$, $A_{12}$, and $A_{13}$ are the unknown coefficients and are used in controlling convergence, and X is one of the coordinate values.

4. The apparatus of claim 1, wherein, when correcting a convergence of a vertical axis direction, the position coordinate generator performs an operation to output values X, X-squared ($X^2$) and X-cubed ($X^3$) as the coordinate values of the vertical axis direction, where X is obtained by counting a number of horizontal synchronization signals from a reset value.

5. The apparatus of claim 1, wherein, when correcting a convergence of a horizontal axis direction, the position coordinate generator performs an operation to output values X, X-squared ($X^2$) and X-cubed ($X^3$) as the coordinate values of the horizontal axis direction, where X is obtained by counting a number of pulses, said pulses obtained by dividing a frequency of a system clock signal.

6. The apparatus of claim 1, wherein the operator comprises:
    a multiplier for inputting at least one of values X, $X^2$ and $X^3$ output from the position coordinate generator, and at least one of the unknown coefficients corresponding thereto read from the memory to perform a multiplication operation for calculating each term of the convergence interpolation polynomial, where X is one of the coordinate values; and
    an adder for adding the values of each term calculated by the multiplier and another unknown coefficient of a constant term read from the memory.

7. The apparatus of claim 1, wherein the operator comprises:
    a multiplier for inputting at least one of values X, $X^2$ and $X^3$ output from the position coordinate generator, and at least one of the unknown coefficients corresponding thereto read from the memory to perform a multiplication operation for calculating each term of the convergence interpolation polynomial, where X is one of the coordinate values; and
    an adder for adding only the values of each term calculated by the multiplier and another unknown coefficient of a constant term read from the memory.

8. The apparatus of claim 1, wherein the operator comprises:
    at least two multipliers, wherein at least one of values X, $X^2$ and $X^3$ output from the position coordinate generator, and at least one of the unknown coefficients corresponding thereto read from the memory to perform a multiplication operation for calculating each term of the convergence interpolation polynomial, are input into one of said at least two multipliers, and wherein each corresponding pair of said at least one of the coordinate values and said at least one of the unknown coefficients is input into a different one of said at least two multipliers, where X is one of the coordinate values; and
    an adder for adding the values of each term calculated by each different said one of at least two multipliers and another unknown coefficient of a constant term read from the memory.

9. A ring spline convergence correction method for use in a television, the method comprising the steps of:
    (a) performing, at a microprocessor, a first predetermined operation to output unknown coefficients of a convergence interpolation polynomial in each interval between two points having adjacent coordinates, assuming that coordinate values of control points on adjacent lines are continuous;
    (b) performing a second predetermined operation to output the coordinate values of the convergence control points; and
    (c) performing a ring spline operation to output interpolated convergence correction values by applying the unknown coefficients output in the step (a) and the coordinate values output in the step (b) to the convergence interpolation polynomial.

10. The method of claim 9, wherein the convergence interpolation polynomial is a third order spline interpolation polynomial, and the third order spline interpolation polynomial is expressed by the function $f(X)=Y_0+K_1X+A_{12}X^2+A_{13}X^3$, where $Y_0$, $K_1$, $A_{12}$, and $A_{13}$ are the unknown coefficients and are used in controlling convergence, and X is one of the coordinate values.

11. The method of claim 9, wherein, in the step (b), in convergence correction of a vertical axis direction, the second predetermined operation is performed to output values X, X-squared ($X^2$), and X-cubed ($X^3$) as the coordinate values, where X is obtained by counting a number of horizontal synchronization signals from a reset value.

12. The method of claim 9, wherein, in the step (b), in convergence correction of a horizontal axis direction, the second predetermined operation is performed to output values X, $X^2$, and $X^3$ as the coordinate values, where X is obtained by counting a number of pulses, said pulses obtained by dividing a frequency of the system clock signal.

13. The method of claim 12, further comprising the step of resetting the counting by the horizontal synchronization signal.

14. The method of claim 9, wherein the first predetermined operation is performed to output the unknown coefficients of the convergence interpolation polynomial at a first point on a first horizontal line, wherein a first point on a second horizontal line is an adjacent point.

15. The method of claim 9, wherein the first predetermined operation is performed to output the unknown coefficients of the convergence interpolation polynomial at a last point on a last horizontal line, wherein a last point on a preceding horizontal line is an adjacent point.

* * * * *